(12) United States Patent
Tillotson

(10) Patent No.: US 7,667,635 B2
(45) Date of Patent: Feb. 23, 2010

(54) SYSTEM AND METHOD USING AIRBORNE RADAR OCCULTATION FOR MEASURING ATMOSPHERIC PROPERTIES

(75) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 94 days.

(21) Appl. No.: 12/115,243

(22) Filed: May 5, 2008

(65) Prior Publication Data

US 2009/0273510 A1    Nov. 5, 2009

(51) Int. Cl.
    *G01S 13/95* (2006.01)
(52) U.S. Cl. .................................................. 342/26 B
(58) Field of Classification Search ................ 342/26 B
    See application file for complete search history.

(56) References Cited

U.S. PATENT DOCUMENTS

| 4,050,067 | A | * | 9/1977 | Elmore, Jr. ................... 342/191 |
| 5,615,118 | A | * | 3/1997 | Frank ............................. 701/4 |
| 5,675,081 | A | * | 10/1997 | Solheim et al. ............ 73/170.28 |
| 6,731,906 | B2 | * | 5/2004 | Sokolovskiy et al. ...... 455/12.1 |
| 7,365,674 | B2 | * | 4/2008 | Tillotson et al. ........... 342/26 B |

\* cited by examiner

*Primary Examiner*—Thomas H Tarcza
*Assistant Examiner*—Matthew M Barker
(74) *Attorney, Agent, or Firm*—Harness, Dickey & Pierce, P.L.C.

(57) ABSTRACT

A method for estimating an atmospheric condition existing between a portion of the Earth's surface and an airborne mobile platform travelling over the portion of the Earth's surface. The method may involve emitting a radar signal beam toward the Earth's surface from the mobile platform and receiving back at least a portion of the radar signal beam reflected from the Earth's surface. The time of flight information of the radar signal beam is analyzed as a function of elevation angle to determine a specific time of flight value associated with a specific elevation angle of the radar signal beam. The specific time of flight value is used to determine a refractivity of the atmosphere through which the radar signal beam and the reflected radar signal has passed. The refractivity is used to determine the atmospheric condition.

20 Claims, 10 Drawing Sheets

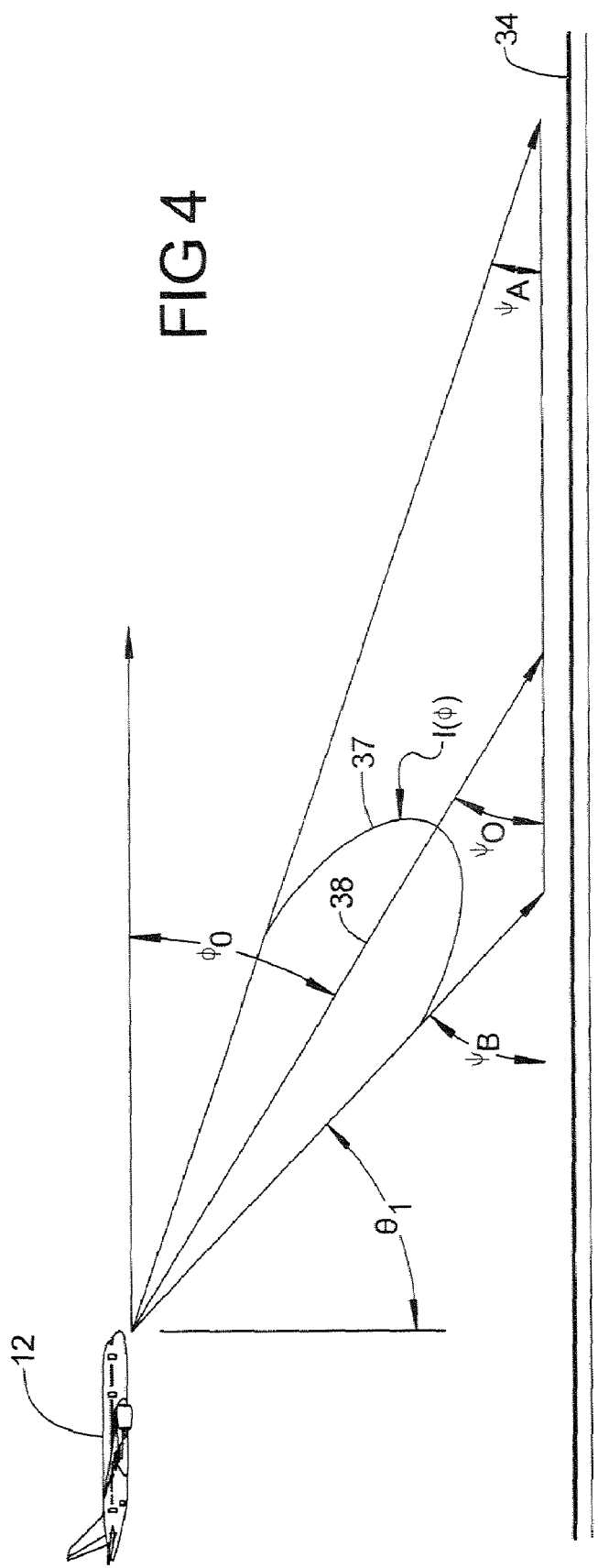

$I_{norm}(TOF) = I_{rx}(TOF) R^4 / \sin(\psi)$

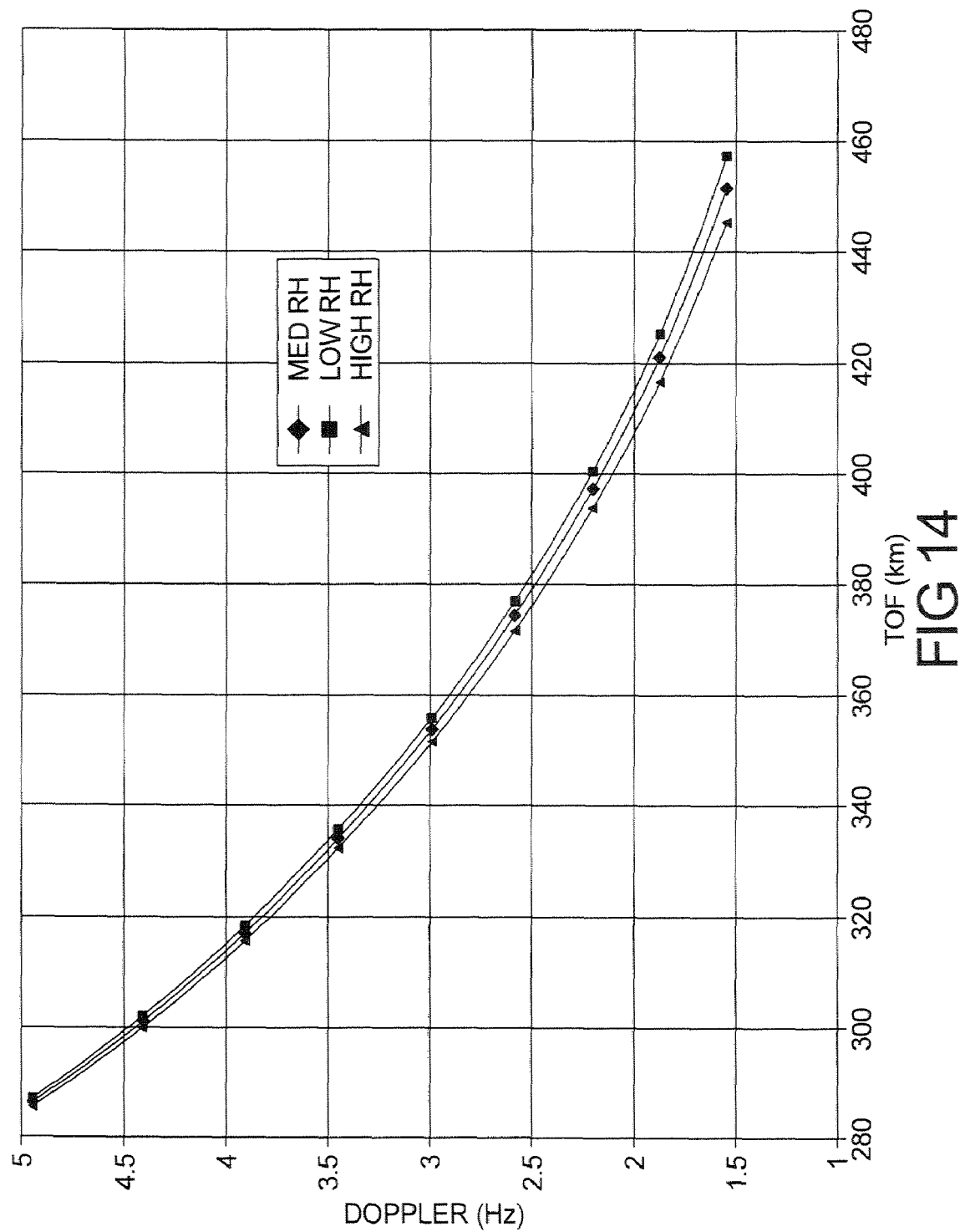

SYSTEM AND METHOD USING AIRBORNE RADAR OCCULTATION FOR MEASURING ATMOSPHERIC PROPERTIES

FIELD

The present disclosure relates to systems and methods for determining weather conditions, and more particularly to a system and method that makes use of an airborne mobile platform's weather radar to help predict atmospheric conditions between the mobile platform and the Earth's surface.

BACKGROUND

The statements in this section merely provide background information related to the present disclosure and may not constitute prior art.

Various systems have been used over the years to help measure atmospheric conditions with the goal of predicting weather conditions. One such method is the use of radiosondes, also known as weather balloons. These devices measure temperature humidity and other variables from the ground up to fairly high altitude. Another approach has been to drop parachute the equivalent of radiosondes from in-flight aircraft. Still another approach has involved Global Positioning System (GPS) occultation measurements from low orbiting satellites, such as the Constellation Observing System for Meteorology, Ionosphere and Climate (COSMIC) constellation of six satellites. Yet another approach has been to use GPS or IRIDIUM (c) occultation measurements taken from in-flight aircraft. IRIDIUM refers to the Iridium Satellite LLC of Bethesda Md.

The above approaches have met with varying degrees of success. For example, radiosonde measurements are effective but their use is limited to industrialized countries over land. The infrastructure to routinely launch and monitor them is lacking in many nations, and particularly over seas and oceans, which cover a substantial portion of the Earth's surface. Dropping small parachute packages from airborne aircraft is technically effective, but is costly over time and in some situations may raise environmental issues.

GPS occultation with satellites makes effective measurements only at fairly high altitudes. The GPS signal is typically too week to effectively traverse the lower atmosphere with sufficient signal quality to allow an occultation measurement. In addition, the spatial and temporal coverage of low Earth orbit (LEO) satellite constellations is too sparse to allow comprehensive coverage.

GPS or Iridium occultation measurements from aircraft provide better coverage than measurements from satellites. Measurements also reach somewhat lower altitudes because the signal does not need to traverse the entire atmosphere twice. However, there is the cost of installing additional antennas and occultation receivers on the aircraft, which in some cases may add significantly to the cost of implementing such a system. Reflected signal occultation is technically better than standard occultation. The reflected signal, especially using Iridium satellites, reaches all the way to the surface, allowing a full profile of the atmosphere to be measured. However, as with standard occultation, this method requires adding special antennas and receivers to the aircraft, and therefore may increase the cost of implementing such a system.

SUMMARY

In one aspect the present disclosure involves a method for estimating an atmospheric condition existing between a portion of the Earth's surface and an airborne mobile platform travelling over the portion of the Earth's surface. The method may comprise emitting a radar signal beam toward the Earth's surface from the mobile platform and receiving at least a portion of the radar signal beam reflected from the Earth's surface; analyzing time of flight information of the radar signal beam as a function of elevation angle, to determine a specific time of flight value associated with a specific elevation angle of the radar signal beam; using the specific time of flight value to determine a refractivity of the atmosphere through which the radar signal beam and the reflected radar signal has passed; and using the refractivity to determine the atmospheric condition.

In another aspect a method for estimating an atmospheric condition existing between a portion of the Earth's surface and an airborne mobile platform travelling over the portion of the Earth's surface is disclosed. The method may comprise emitting a radar signal beam toward the Earth's surface from an on-board radar system of the mobile platform; receiving a reflected radar signal reflected from the Earth's surface; measuring time of flight information for the reflected radar signal as a function of an elevation angle of the reflected radar signal; analyzing the time of flight information to determine a time of flight value for the reflected radar signal that corresponds to an elevation angle of an approximate center portion of the radar signal beam; determining a refractivity of an atmosphere through which the reflected radar signal has passed based on the time of flight value corresponding to said elevation angle of said approximate center portion of said radar signal beam; and estimating the atmospheric condition based on said determined refractivity.

In still another aspect a method is disclosed for estimating an atmospheric condition existing between a portion of the Earth's surface and an airborne mobile platform traveling over the portion of the Earth's surface. The method may comprise emitting a plurality of radar signal beam pulses toward the Earth's surface from the mobile platform and receiving at least a portion of each radar signal beam pulse reflected from the Earth's surface; analyzing time of flight information of the radar signal beam pulses as a function of an elevation angle at which each said radar beam signal pulse was transmitted, to determine a plurality of specific time of flight values associated with specific ones of the elevation angles at which the radar signal beam pulses were transmitted; determining refractivity profile of the atmosphere through which the radar signal beam pulses and the reflected portions of the radar signal beam pulses have passed by using said specific time of flight values; and determining a vertical profile of the atmospheric condition based on said refractivity profile, said vertical profile being representative of atmospheric information at a plurality of different altitudes between said Earth's surface and said airborne mobile platform.

In still another aspect of the present disclosure a system is disclosed for estimating a refractivity of an atmosphere existing between a portion of the Earth's surface and an airborne mobile platform travelling over the portion of the Earth's surface. The system may include a radar system for emitting a radar signal beam toward the Earth's surface from the mobile platform and receiving at least a portion of the radar signal beam reflected from the Earth's surface; and a processor in communication with the radar system and adapted to measure time of flight information of the radar signal beam as a function of elevation angle, to determine a specific time of flight value associated with a specific elevation angle of the radar signal beam, and from the specific time of flight value, to determine a refractivity of the atmosphere through which the radar signal beam and the reflected radar signal has passed.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4 is a diagram of the aircraft of FIG. 1 illustrating how the geometry of the radar signal makes the peak intensity of the signal reaching the Earth's surface greater at the portion of the footprint of the beam that is offset from the beam's center point, and closer to the aircraft;

FIG. 5 illustrates that the intensity of the beam in FIG. 4 is greater at a point that is offset from the center of the beam, and closer to the aircraft;

FIG. 14 is a graph showing Doppler differences at various times of flight values for the three different conditions of relative humidity.

DETAILED DESCRIPTION

The following description is merely exemplary in nature and is not intended to limit the present disclosure, application, or uses. As used herein, the term exemplary refers to an example and not necessarily an ideal.

Figure 1:
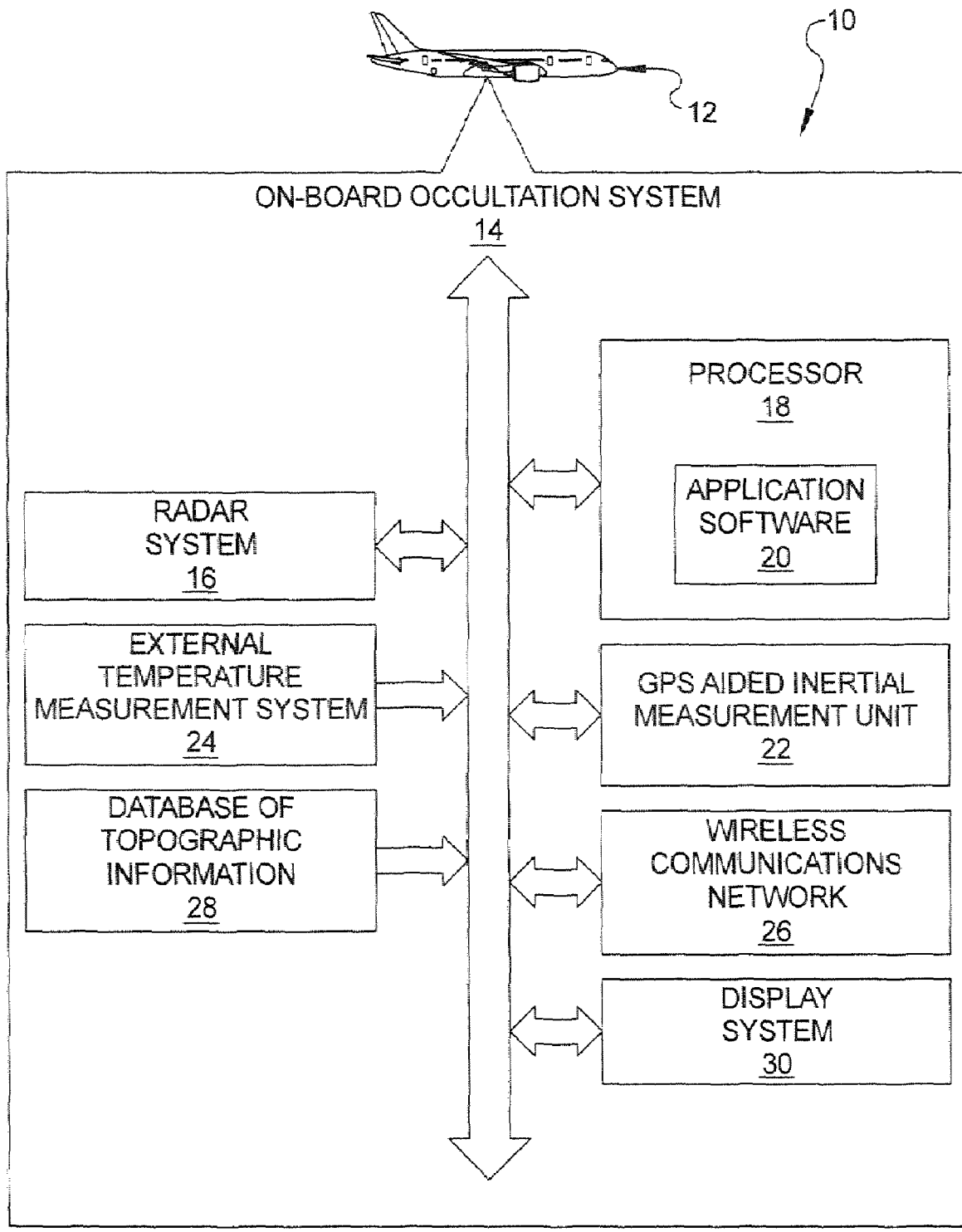
FIG. 1 is a block diagram of one embodiment of a system in accordance with the present disclosure.

Referring to FIG. 1, there is shown a drawing of one embodiment of a system 10 for performing radar occultation in accordance with the present disclosure. The system 10 makes use of an airborne mobile platform 12, which in this example is an aircraft. However, it will be appreciated that any form of manned or unmanned airborne mobile platform could potentially be used as part of the system 10. For convenience, the mobile platform 12 will be referred to throughout the following discussion simply as "aircraft 12".

The aircraft 12 carries an onboard occultation system 14 for performing radar occultation to help estimate temperature and water vapor within a vertical column of the Earth's atmosphere. This is accomplished by measuring refractivity within the vertical column of atmosphere, as will be described in greater detail in the following paragraphs. The occultation system 14 includes a radar system 16 in communication with a processor 18. The processor 18 includes application software 20 that includes various algorithms needed to process time of flight ("TOF") information received from the radar system 14 and to determine refractivity information therefrom. More specifically, the application software is configured to use data about a Doppler shift, reflected intensity of a radar signal, TOF information, air temperature, atmospheric pressure, aircraft motion, and attitude to compute refractivity profiles. The occultation system 14 may also include a GPS aided inertial measurement unit 22 for supplying information to the processor 18 concerning the location, heading, altitude and attitude of the aircraft 12. An external temperature measurement system 24 may be used to provide information on the air temperature outside of the aircraft 12, as well as the atmospheric pressure, to the processor 18. The values of these variables provide a mathematical boundary condition for valid solutions of the atmosphere profile, i.e. the estimated profile must match the measured conditions at the altitude of aircraft 12. A wireless electromagnetic communication network 26 (e.g., an RF communication network) is in communication with the processor 18 for enabling bidirectional wireless communication between a remote subsystem, for example a remotely located ground station, and the processor 18. Optionally a database of topographic information 28 may be provided if the aircraft is expected to be flying over land having uneven terrain while making occultation measurements. A display system 30 may be used to display measured refractivity information to an operator.

A principal advantage of the occultation system 14 is that it makes use of the existing on-board radar system 16 of the aircraft 12. This eliminates the need, and the additional cost, of employing a separate radar system on the aircraft 12 just to perform radar occultation measurements. The processor 18 may be a pre-existing processor on the aircraft that is capable of running the application software 20.

It will also be appreciated that present day radar systems, such as radar system 14, measure the intensity and frequency of a reflected radar signal over a large plurality of short time intervals, referred to in the art as "range gates". The range gates are typically each on the order of between about 3 ms-15 ms for civilian airborne weather radar. Each specific range gate corresponds to a particular TOF. The radar system 14 also may be capable of displaying Doppler shift and estimated reflectivity for each point on a radar screen. When a radar signal is reflected from clouds or rain, large changes in the Doppler shift over small distances can be used to warn the pilot of probable turbulence.

The occultation system 14 operates to estimate a vertical profile of temperature and water vapor in the atmosphere. It accomplishes this by measuring refractivity, N, which is related to index of refraction, n, by:

$$N=(n-1)\times 10^6 \quad \text{(Equation 1)}$$

The refractivity depends on the air's water content and density, where density is a function of pressure and temperature. An empirical formula is used to calculate the refractivity of a parcel of air as shown in equation 2. In this formula, T is the temperature in Kelvin, $p_d$ is the partial pressure of dry air, $p_v$ is the partial pressure of water vapor, $Z_d$ is the inverse compressibility factor for dry air and $Z_w$ is the inverse compressibility factor for wet air. The constants $k_1$, $k_2$ and $k_3$ are empirically determined.

$$N = k_1\left(\frac{p_d}{T}\right)Z_d^{-1} + \left[k_2\left(\frac{p_v}{T}\right)+k_3\left(\frac{p_v}{T^2}\right)\right]Z_w^{-1} \quad \text{(Equation 2)}$$

This formula can also be expressed with the constants determined as:

$$(n-1)\times 10^6 = N = 77.6(p_d/T)Z_d^{-1} + 64.8(e/T)Z_w^{-1} + 3.776\times 10^5(e/T^2)Z_w^{-1} \quad \text{(Equation 3)}$$

where "e" is $p_v$. Thus, measuring refractivity allows temperature and humidity to be constrained in terms of each other. Given this mutual constraint, and using scientifically-based models of how temperature and humidity vary in the atmosphere, together with ancillary information from other weather instruments and numerical models, weather modelers can use refractivity measurements to compute the most probable estimates of temperature and humidity.

Figure 2:
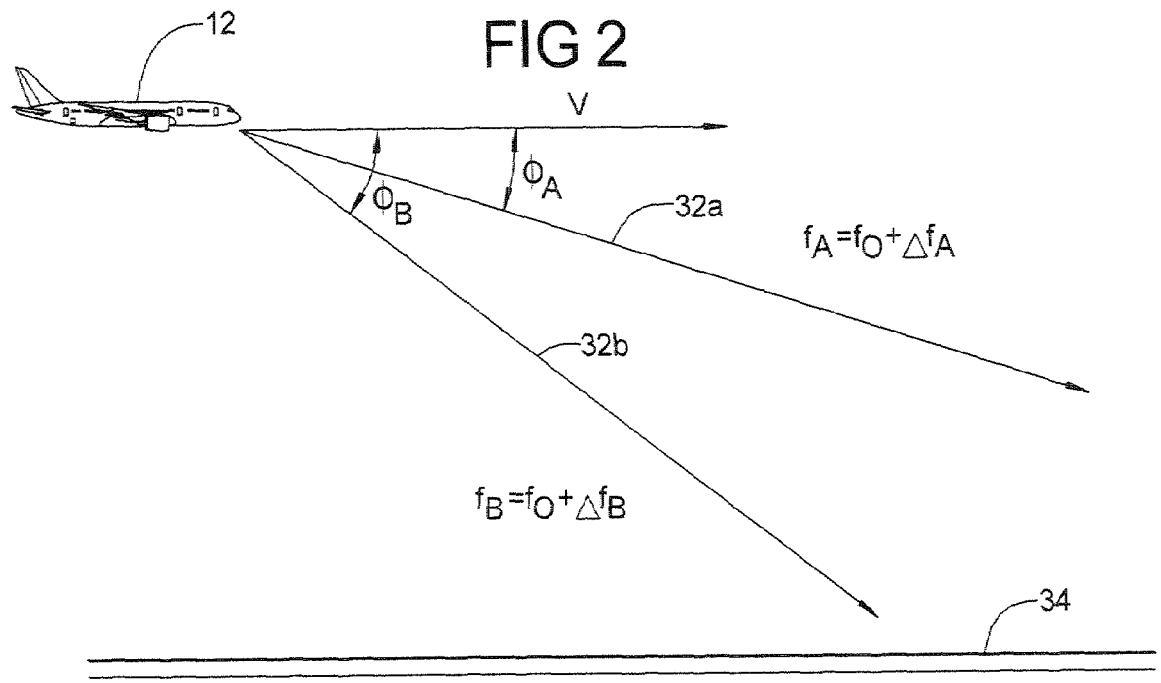
FIG. 2 is a diagram of the aircraft shown in FIG. 1 and how different elevation angles of a radar signal transmitted from the radar system of the aircraft can yield different Doppler shifts.

Referring to FIG. 2, in operation a radar signal 32a or 32b leaves the nose or tail of the aircraft 12. In this example the radar signal 32a or 32b is shown being projected forwardly of the aircraft 12, but it will be appreciated that the signal could just as readily be projected rearwardly from the aircraft 12. Because of the airplane's motion, the radar signal is Doppler-shifted relative to the ground. The amount of Doppler shift Δf for the transmitted signal depends on the angle φ between the RF propagation vector and the aircraft's 12 velocity vector. This relationship is described by equation 4:

$$\Delta f_{tx} = v/cf_0 \cos\phi \quad \text{(Equation 4)}$$

where v is aircraft speed, $f_0$ is the nominal radar frequency, and c is the speed of light in vacuum. Different angles, $\phi_A$ and $\phi_B$, yield different Doppler shifts $\Delta f_A$ and $\Delta f_B$ for the radar signals 32a and 32b.

After traveling for some time, the signal reaches the Earth's surface 34. It reflects from the surface 34, with part of the signal returning to the aircraft 12. The total time between when the radar signal was transmitted and when the reflected signal is received is the TOF. Because of the aircraft's 12 motion relative to the reflection point, the radar system's 16 receiver measures an additional Doppler shift $\Delta f_{rx}$ which is the same as the Doppler shift for the outbound signal. Thus the measured frequency at the receiver of the radar system 16, $f_{rx}$, is given by Equations 5-7:

$$f_{rx} = f_0 + \Delta f_{tx} + \Delta f_{rx} \quad \text{(Equation 5)}$$
$$= f_0 + \Delta f_{total} \quad \text{(Equation 6)}$$
$$= f_0(1 + 2v/c \cos\phi). \quad \text{(Equation 7)}$$

The measured value of $f_{rx}$ can be used to estimate the angle φ by rearranging Equation 7 as follows:

$$\phi = \cos^{-1}\left[C(f_{rx}/f_0 - 1)/2v\right] \quad \text{(Equation 8)}$$

More precisely, if the reflected radar signal contains a range of frequencies, the portion of the signal that departed and returned can be isolated at a particular angle φ by filtering to select only the frequencies in a narrow band near the corresponding $f_{rx}$. This is useful because a typical radar beam is wide enough in elevation that it strikes the Earth's surface 34 at a wide range of distances ahead of the aircraft 12, yielding a wide range of TOF measurements. Frequency filtering thus effectively provides a narrower beam.

If the atmosphere were isotropic, the path of the radar signal would be a straight line and the signal's speed along that path would be uniform. The TOF along any path would be proportional to the path length multiplied by the atmosphere's mean index of refraction.

Figure 3:
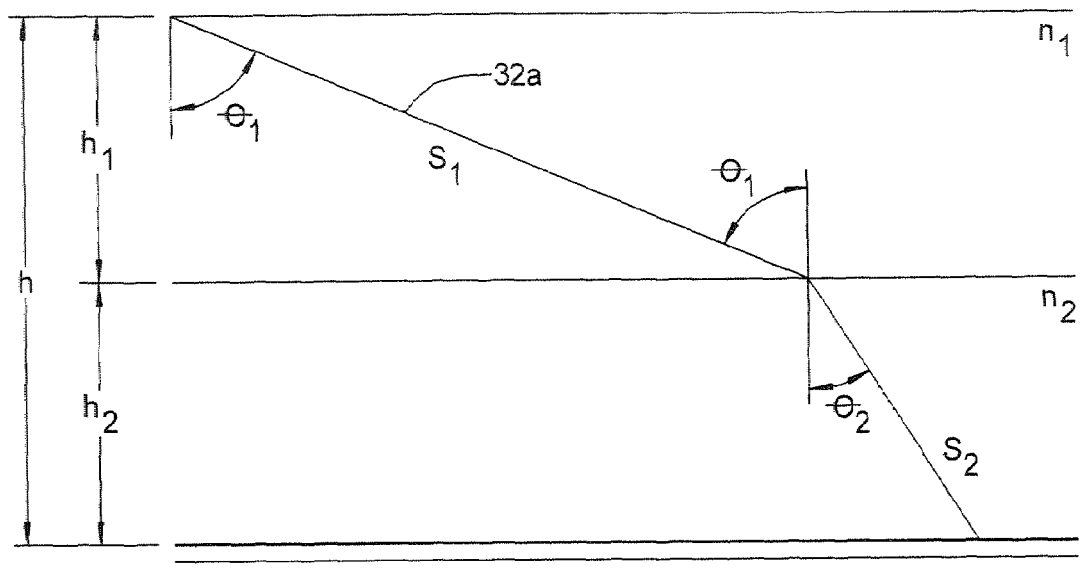
FIG. 3 is a diagram illustrating how an atmosphere with two or more layers having different indices of refraction causes a difference in the index of refraction experienced by a radar signal.

Referring to FIG. 3, now consider a case where the atmosphere has two layers with different indices of refraction, n1 and n2, and thicknesses h1 and h2. The radar signal 32a refracts (bends) as it crosses from one layer to another, and again when it returns along the same path. The bending is described by Snell's law:

$$n_1 \sin\theta_1 = n_2 \sin\theta_2. \quad \text{(Equation 9)}$$

If the aircraft's 12 altitude "h" and the index of refraction "$n_1$" at altitude h (which the aircraft 12 can measure directly or compute from measurements of T, $p_d$, and $p_v$) is known, and if one directly measures the angle $\theta_1$ and the total path length $s_0$ given by:

$$s_0 = s_1 + s_2, \quad \text{(Equation 10)}$$

then $n_2$ may be computed as follows:

$$s_1 = \frac{h_1}{\cos\theta_1} \quad \text{(Equation 11)}$$

and $$s_1 = \frac{h_2}{\cos\theta_2} \quad \text{(Equation 12)}$$

so that $$s_0 = \frac{h_1}{\cos\theta_1} + \frac{h_2}{\cos\theta_2} \quad \text{(Equation 13)}$$

which can be rearranged to solve for $\theta_2$ $$\theta_2 = \cos^{-1}\left(\frac{h_2}{s_0 - \frac{h_1}{\cos\theta_1}}\right) \quad \text{(Equation 14)}$$

Substituting this expression into Snell's law (Equation 9) and rearranging, can solve for $n_2$:

$$n_2 = \frac{n_1 \sin\theta_1}{\sin\left[\cos^{-1}\left(\frac{h_2}{s_0 - \frac{h_1}{\cos\theta_1}}\right)\right]} \quad \text{(Equation 15)}$$

which indicates refractivity in layer 2 by substituting $n_2$ into Equation 1.

Since the total path length $s_0$ cannot be directly measured, but the radar system 16 can measure TOF, which is related to path length by equation 16, then:

$$TOF = 2(s_1 n_1 + s_2 n_2)/c. \quad \text{(Equation 16)}$$

Substituting expressions for $s_1$ and $s_2$ (Equations 11 and 12) into equation 16 gives:

$$TOF = \frac{2}{c}\left(\frac{n_1 h_1}{\cos\theta_1} + \frac{n_2 h_2}{\cos\theta_2}\right) \quad \text{(Equation 17)}$$

Because Equation 17 includes $n_2$, it cannot be solved for $n_2$ simply by solving this equation for $\theta_2$ and substituting the result into Equation 9 as above, as there are still two unknowns. However, by measuring TOF at two different values of $\theta$, the two simultaneous equations can be solved to obtain both of the unknowns $\theta_2$ and $n_2$.

Unfortunately, a radar beam emitted from an aircraft flying at a cruise altitude (typically 30,000-35,000 feet), and reflected from the Earth's surface, is too wide in elevation to give a precise measurement of TOF for a given $\theta_1$ with a single radar pulse. A simplified illustration of a typical radar beam 37 is shown in FIG. 4. In practice, the reflected signal is received at various TOFs, one for each range gate, that correspond to various values of $\theta_1$. The occultation system 14 may significantly improve the TOF precision in any one of three distinct and different ways.

Figure 6:
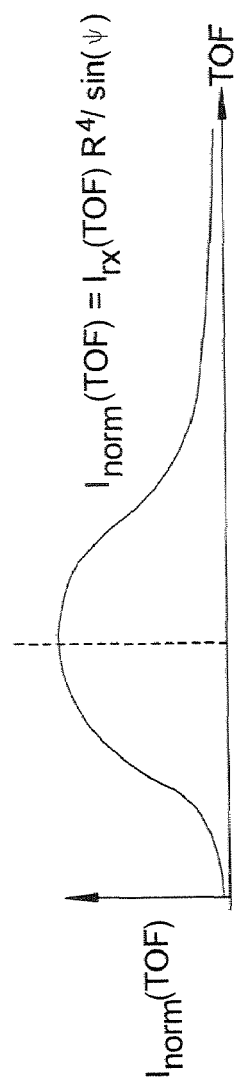
FIG. 6 illustrates that the normalized intensity of the beam represents a corrected beam that puts peak intensity at the approximate center of the beam.

The first approach involves exploiting intensity data and the geometry of the radar reflection to estimate TOF at the center of the radar signal beam. As FIGS. 4-6 illustrate, the reflected intensity of the radar beam is proportional to surface reflectivity $\sigma$ times the sine of the grazing angle $\psi$ times $R^{-4}$, where "R" is the range. This causes peak reflected intensity of the radar signal to occur at a TOF value less than the TOF of the point where the center of the radar beam, designated by line 38, touches the Earth's surface 34. This is illustrated in FIG. 5 where the reflected intensity is at a maximum at a point that corresponds to an elevation angle that is offset from the center 38 of the beam 37 towards the aircraft 12. Given the aircraft's 12 altitude and attitude, the processor 18 estimates $\psi$ and R corresponding to the TOF for each range gate and uses those values to compute a normalized intensity $I_{norm}$ for the TOF for each range gate. If $\sigma$ is roughly constant over the beam footprint (as over the ocean), then the peak of $I_{norm}$ occurs at the TOF corresponding to $\theta_1$, where $\theta_1 = \pi/2 - \phi_0$. The processor 18 may use the values of $I_{norm}$ vs. TOF to compute the best-fit value of TOF where the peak $I_{norm}$ occurs.

Second, Equation 7 may be used to isolate the part of the signal with Doppler shift $\Delta f_{total}$ corresponding to a given angle $\theta_1$. The processor 18 filters the receiver output to amplify the signal at $f_{rx} = f_0(1 + 2 v/c \cos\phi)$, where $\phi = \pi/2 - \theta_1$. This sharpens the peak of $I_{norm}$ vs. TOF. In an optional embodiment the processor 18 may use a multi-channel filter to amplify the signal at multiple frequencies $f_i$ corresponding to multiple angles $f_i$, as well as a model of the beam pattern to adjust the $I_{norm}$ values to compensate for the intensity at various angles $(\theta_i - \theta_1)$ off the center 38 of the beam 37; and additional processing power to compute the TOF for multiple values of $\theta_i$ from a single radar pulse.

Third, noise can further be reduced by using large sample sets. The processor 18 may statistically combine data from a large number of radar pulses at a variety of pointing angles to produce a best-fit set of atmospheric parameters ($n_1$ and $n_2$ in FIG. 3).

The example above had two atmospheric layers of differing refractivity. In a more realistic model of the atmosphere, there are more than two layers. In this case, many more measurements of $\theta$ and TOF should be made to resolve the refractivity of each layer. The mathematical approach can be similar to the case with two layers, that is, solving a set of simultaneous equations with at least one equation for each layer. Alternatively, it can be fundamentally different, that is, using a variational solver to minimize an overall error function based on the radar observations plus other weather data, or using a trained artificial neural network to estimate the profile based on prior training examples. In either case, the occultation system 14 yields the refractivity in each layer of the atmosphere.

More complex embodiments may be employed to deal with complications that arise due to non ideal surfaces that the radar beam is reflected from. For example, when a radar signal strikes ocean waves, the signal reflects from different heights depending on the angle at which the signal strikes the surface. A nearly vertical signal reflects from points near the trough of the wave. A more horizontal signal reflects from points on the slope or crest of the wave. An enhanced embodiment of the occultation system 14 may use a wave-reflection model, such as that disclosed in "Surface Roughness Estimation from GPS Sea Reflections," Thompson et al., NASA Earth Science Enterprise, IEEE Geoscience and Remote Sensing Symposium, 2002, hereby incorporated by reference. Such a wave reflection model may be used to estimate the distribution of wave shapes and correct the TOF and reflectivity for signals reaching the waves at different angles.

Ocean waves typically move, and therefore induce a Doppler shift in radar signals. Another embodiment of the occultation system 14 may use data about wave speed and direction to adjust the Doppler shift to cancel this effect. The data about wave speed and direction may come via radio from weather services communicating with the aircraft 12 or it may be derived from radar data at angles closer to vertical where refractivity effects are minimal.

Figure 7:
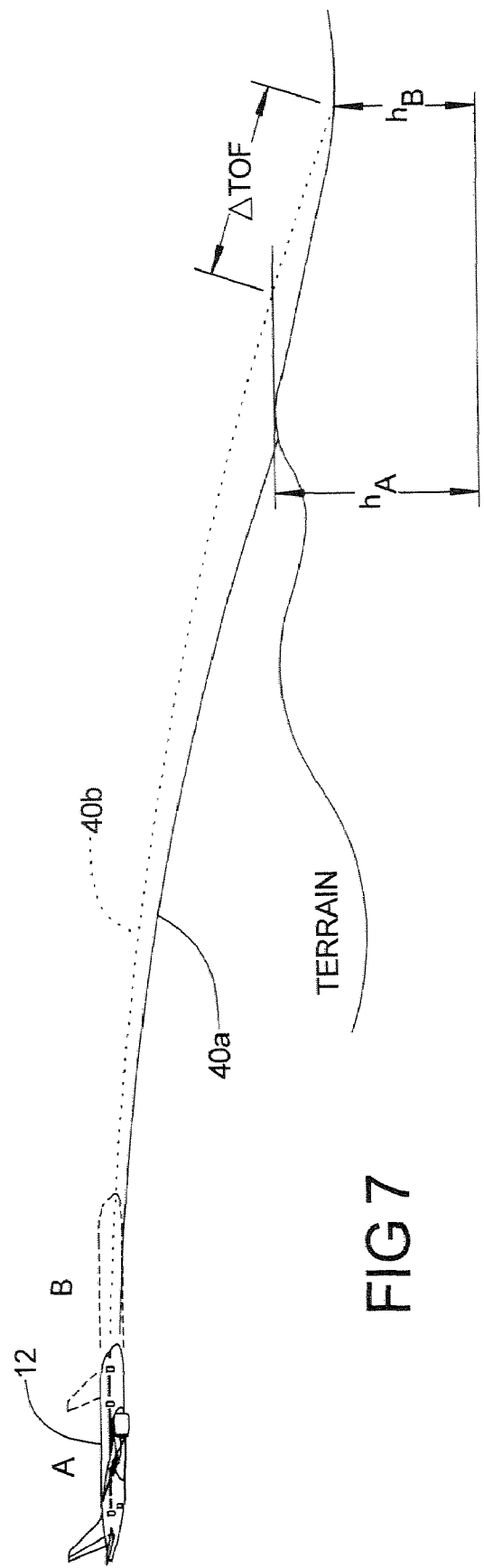
FIG. 7 illustrates how uneven terrain can affect the time of flight of the radar signal.

The methods discussed above work when the Earth's surface is level. However, the surface cannot be perfectly smooth or the surface will not reflect radar signals back toward their source. An alternative embodiment of the occultation system 14 may be used when the earth's surface is not level, for example in regions of rolling hills. This implementation requires that the terrain's altitude variations be represented by a terrain database, in this example database 28 of topographic information shown in FIG. 1. This embodiment uses the topographic database 28, the aircraft's 12 position information obtained from the inertial measurement unit 22 (FIG. 1), and suitable geometric optics formulas to adjust various TOF and values to account for variations in the terrain which is reflecting back the radar signal to the aircraft 12. Referring to FIG. 7, the occultation system 14 may use a terrain database to predict that radar signals 40a emitted at location A with a particular angle (i.e. a particular Doppler shift) will reach the Earth at a height $h_A$ above sea level, while radar signals 40b emitted at location B with the same angle will reach the Earth at height $h_B$. The longer travel distance to reach height $h_B$ results in a longer time of flight as indicated in FIG. 7 (i.e., $\Delta$TOF). The occultation system 14 subtracts this added time, $\Delta$TOF from the TOF measured at location B so the measurement at location B can be combined with the measurement at location A to improve statistical quality of the overall set of measurements.

Figure 8:
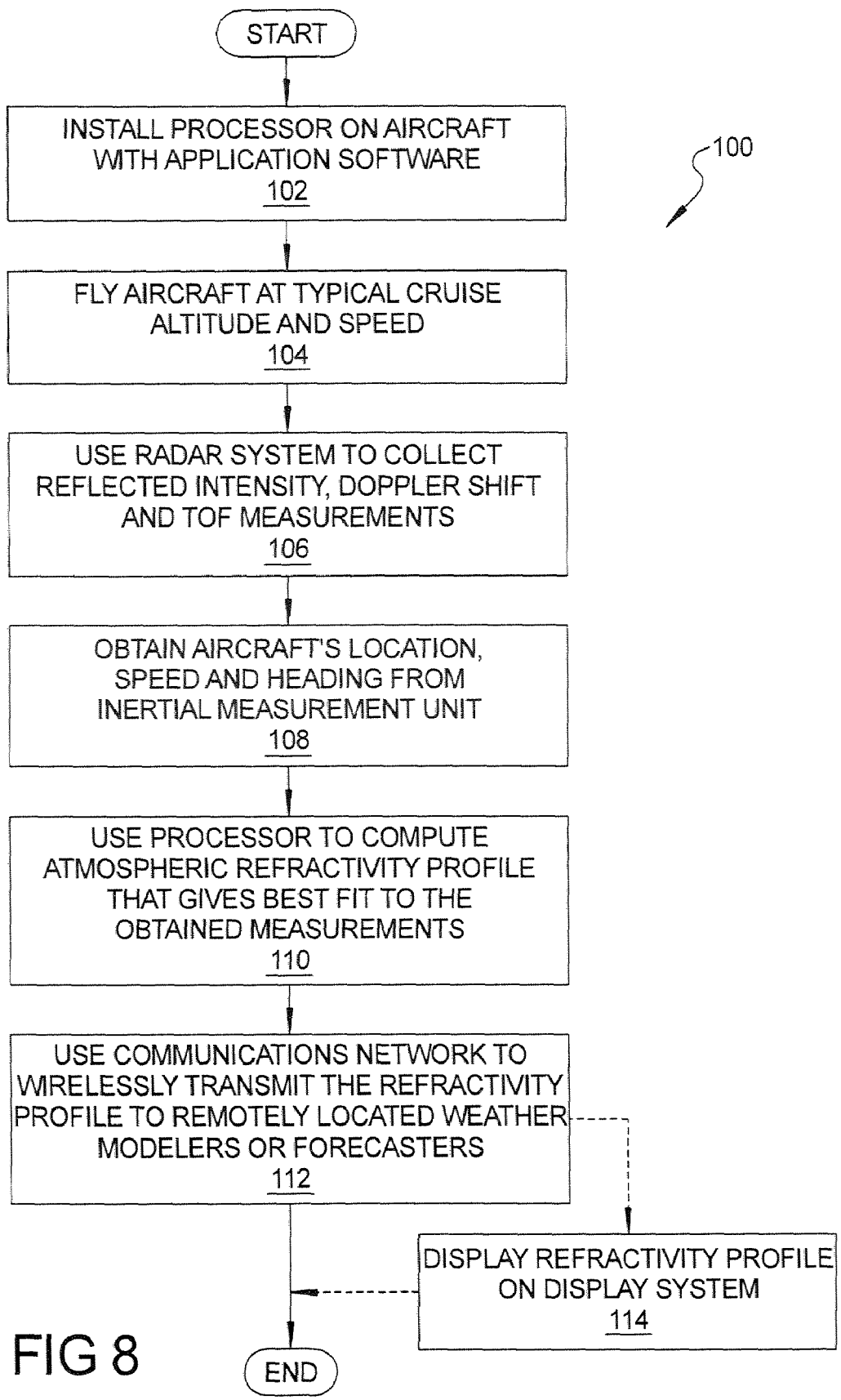
FIG. 8 is a flowchart of operations performed by the system in making refractivity measurements.

Referring now to FIG. 8, a flowchart 100 is shown of operations performed by the occultation system 14. At operation 102 the processor 18 is installed on the aircraft 12 with the application software 20. At operation 104 the aircraft 12 is flown at a typical cruise speed and at altitude (typically about 30,000-35,000 feet). At operation 106 the radar system 16 is used to collect simultaneous measurements of reflected intensity, Doppler shift and TOF to points on the Earth's surface ahead of the aircraft 12 (or possibly behind the aircraft 12).

During operation 106 the radar system 16 may be scanned over a range of elevation angles to emit a plurality of radar signal beam pulses to obtain sufficiently good signal-to-noise ratios at each of several specific TOF values. Concurrently, at operation 108, the aircraft's 12 location, speed and heading are obtained from the inertial measurement unit 22. At operation 110, the processor 18 uses the specific TOF values and the information from the inertial measurement unit 22 to compute the atmospheric refractivity profile that gives the best fit to the obtained measurements. This operation may involve considering other measurements obtained from external, optional components such as radiosonde measurements or radar occultation data from other aircraft, and determining the atmospheric profile that best fits all the available data.

At operation 112 the communications network 26 is used to transmit the refractivity profile to remotely located weather modelers or forecasters. Of course, if such individuals are onboard the aircraft 12, then the refractivity profile may be displayed on the display system 30 at operation 114 and used directly for weather modeling and prediction purposes by the individual(s).

It will be appreciated, then, that the system 10 generates a refractivity profile which can be used to construct a vertical profile of an atmospheric condition. Put differently, the vertical profile will include specific atmospheric information, obtained from specific TOFs, relating to a plurality of different altitudes, and collectively this specific atmospheric information makes up the vertical profile of the atmospheric condition between the Earth's surface and the airborne mobile platform 12.

In a typical application, the radar system 12 may spend part of its time performing refractivity measurements and part of its time doing normal radar actions such as measuring precipitation rates and turbulence, or scanning for other vehicles (e.g., possible hostile vehicles). The occultation system 14 measures refractivity profiles along the ground track of an aircraft in flight. These refractivity profiles can be used to improve atmospheric models, especially models of water vapor, and thereby to improve weather forecasts.

A simulation was performed of the occultation system 14 operating over level terrain. The atmosphere model used in these simulations has ten layers. The refractivity of each layer is computed based on the modeled temperature, pressure, and humidity corresponding to a realistic atmosphere. The model is simplified in that it uses a flat earth. A more realistic model would account for the earth's curvature.

Figure 9:
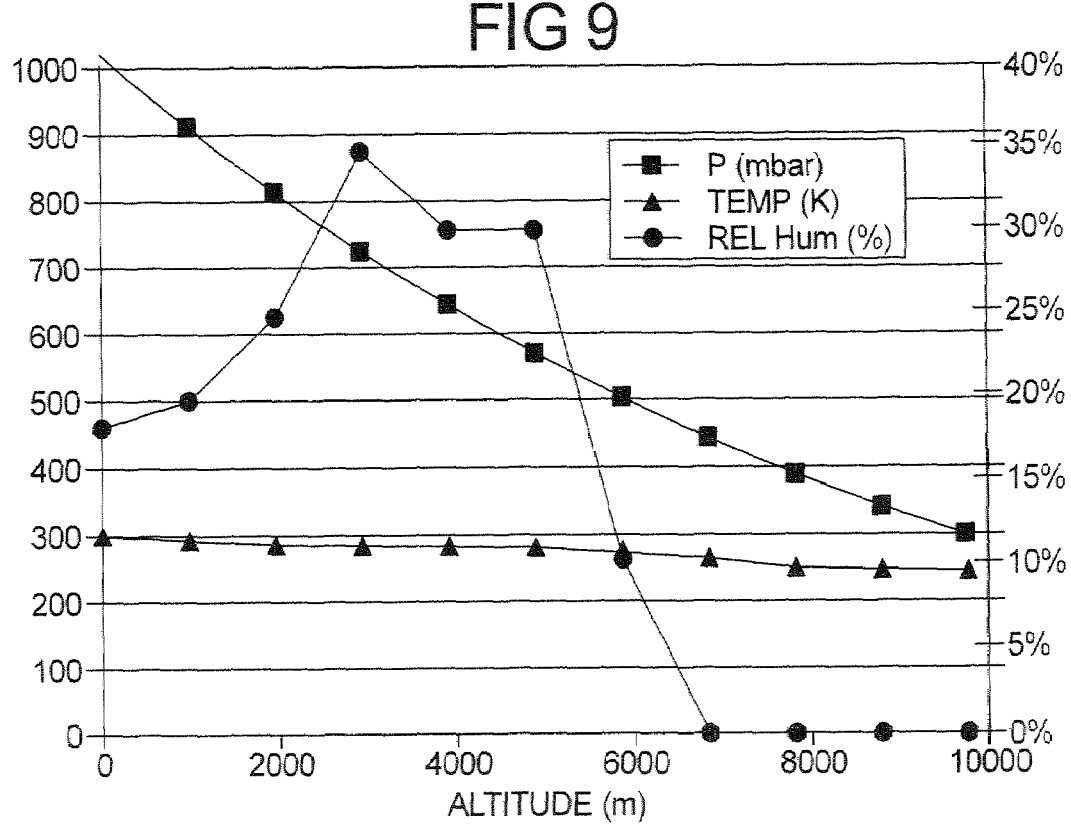
FIG. 9 illustrates an atmospheric module used in a simulation of the present system and method, showing pressure, temperature and relative humidity profiles of an atmosphere through which a radar signal is transmitted.
Figure 10:
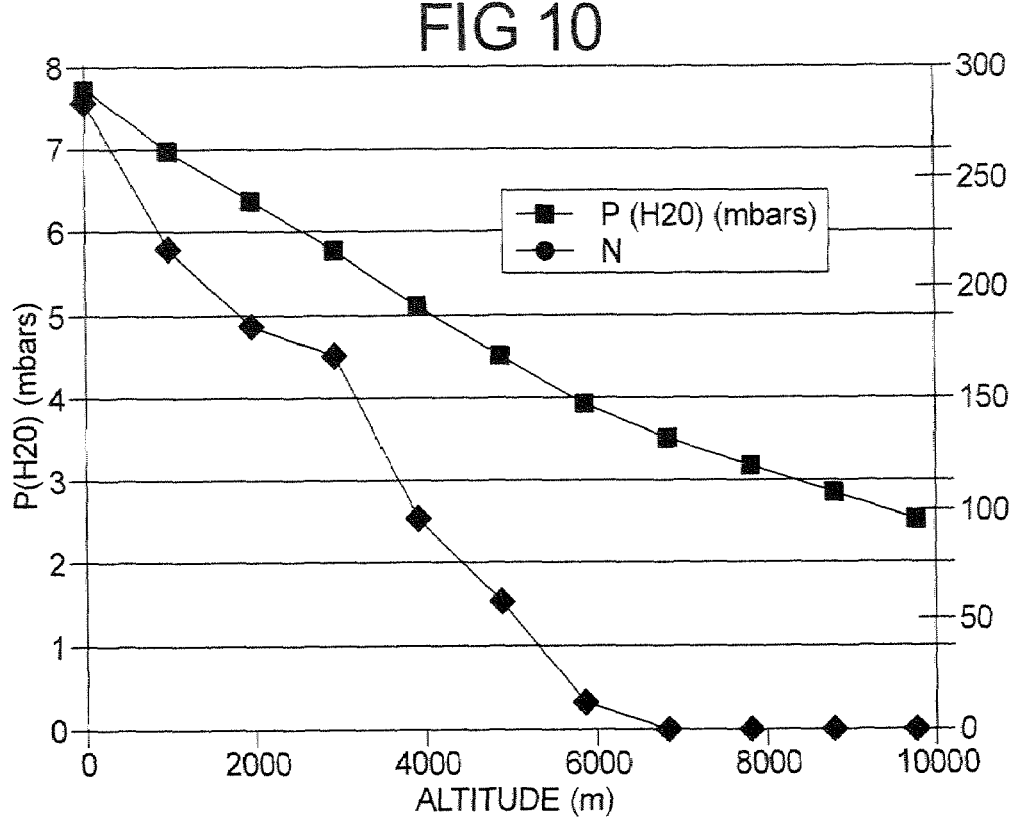
FIG. 10 shows refractivity and the partial pressure of water vapor of an atmosphere corresponding to the atmosphere of FIG. 9.

FIG. 9 shows the pressure, temperature, and relative humidity profiles of the baseline atmosphere in the model. Various runs of the model multiplied this relative humidity profile by factors greater than or less than unity. Various runs also used different values of sea level temperature and pressure. Temperatures and pressures at higher altitudes were computed based on those values, a specified temperature lapse rate, and the ideal gas law. FIG. 10 shows the corresponding partial pressure of water vapor and the refractivity N at each altitude.

Figure 11:
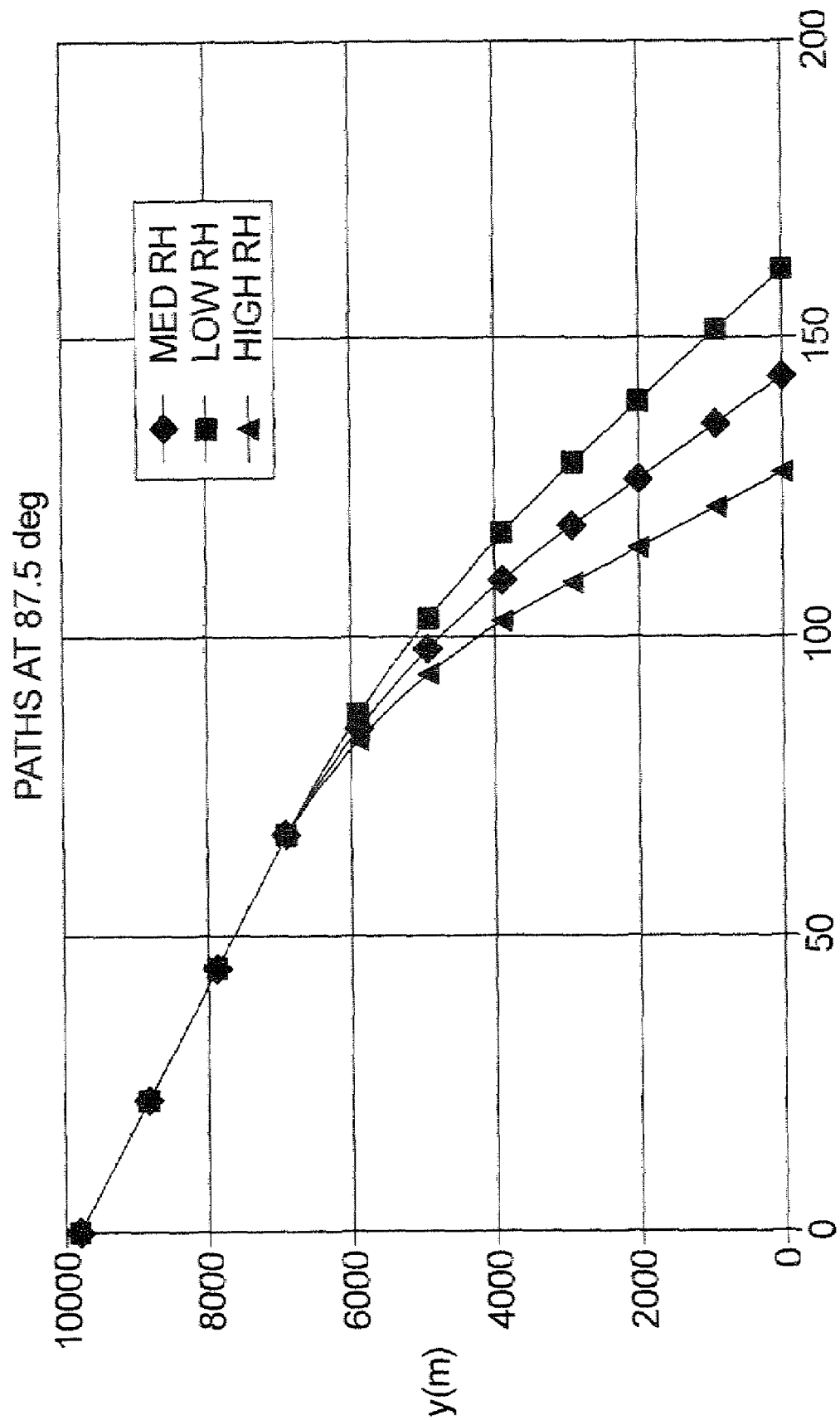
FIG. 11 illustrates how sharper refractivity gradients bend the path of a beam more significantly, and illustrates this principle by showing how a radar signal bends for a low humidity atmosphere, a medium humidity atmosphere and a high humidity atmosphere.

As explained earlier, when refractivity varies with altitude, the path of non-vertical radar signals is bent as it propagates through the atmosphere. Sharper refractivity gradients bend the path more strongly. FIG. 11 illustrates this bending for three cases: a medium humidity case, a low humidity case that is 0.5 times as humid, and a high humidity case that is 1.5 times as humid. However, since the bending in normal conditions is not strong enough to be visible on the plot, this plot is based on an atmosphere that is 200 times as humid as the baseline above. Although it will be understood that such a grossly humid atmosphere is not physically possible on Earth.

Figure 12:
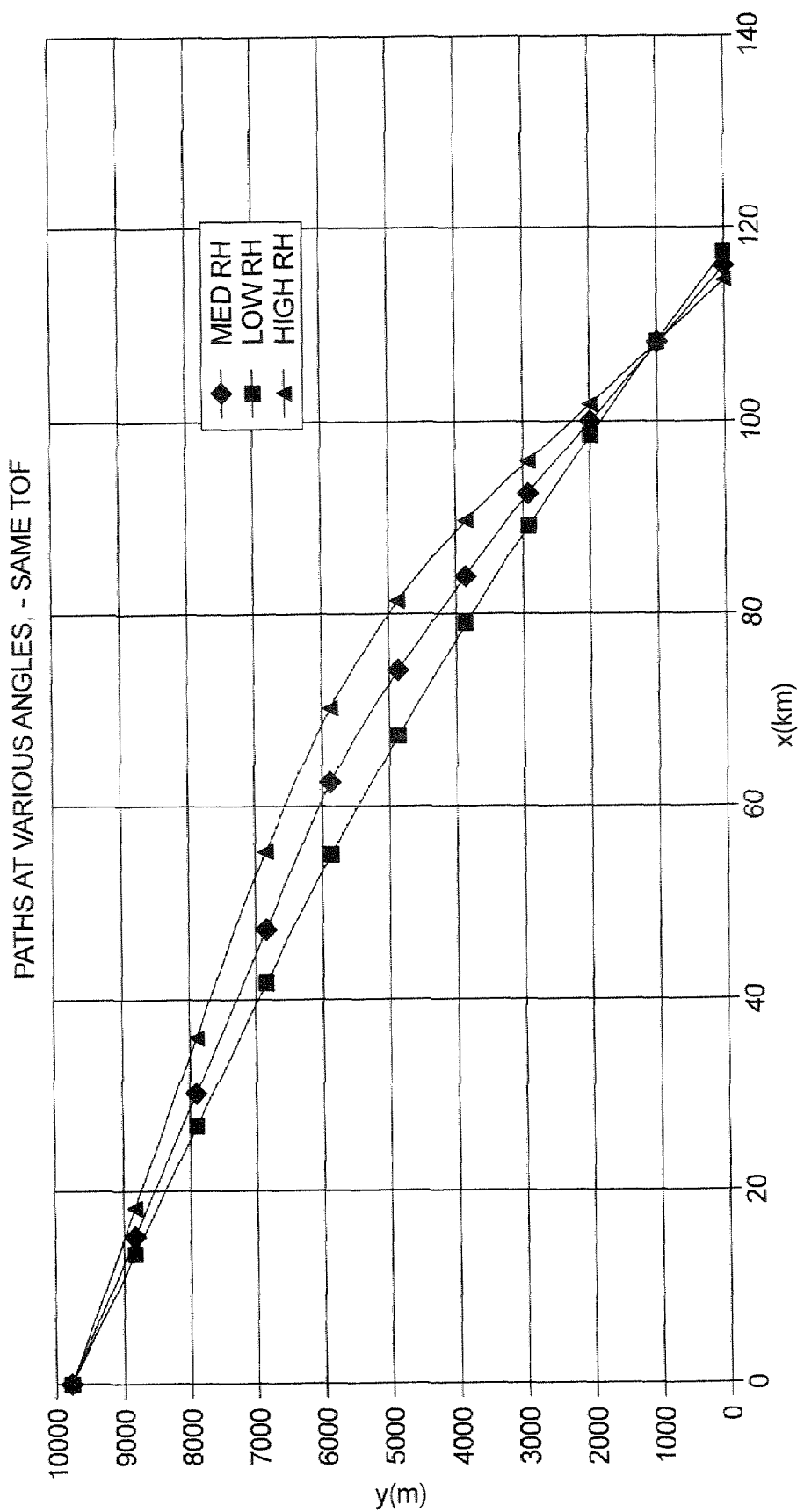
FIG. 12 is another graph illustrating how at the three different relative humidity levels, a radar signal traveling through the atmosphere will travel at different angles but may still have about the same time of flight.

All three of the paths shown in FIG. 11 start at 87.5 degrees from vertical and therefore have identical Doppler shift. The higher humidity cases bend the path substantially more toward the vertical, so those cases have a shorter path and a correspondingly shorter TOF. If a radar system measured Doppler as the independent variable and TOF as the dependent variable, the shorter TOF for a given Doppler shift would indicate high humidity. However, radars typically bin signals by TOF (the independent variable) and measure the corresponding Doppler shift (the dependent variable). Thus, a more realistic perspective is illustrated in FIG. 12. FIG. 12 also uses the 200× humidity profile to make the refraction visible. In FIG. 12 the three paths shown all give about the same TOF: the high humidity path is bent more strongly but hits the ground closer to the aircraft, while the low humidity path is straighter but reflects from a more distant point on the ground. The high humidity path starts at an angle that is farther from vertical than the low humidity path. Thus the radar would distinguish high humidity from low humidity by a larger Doppler shift for a given TOF.

Figure 13:
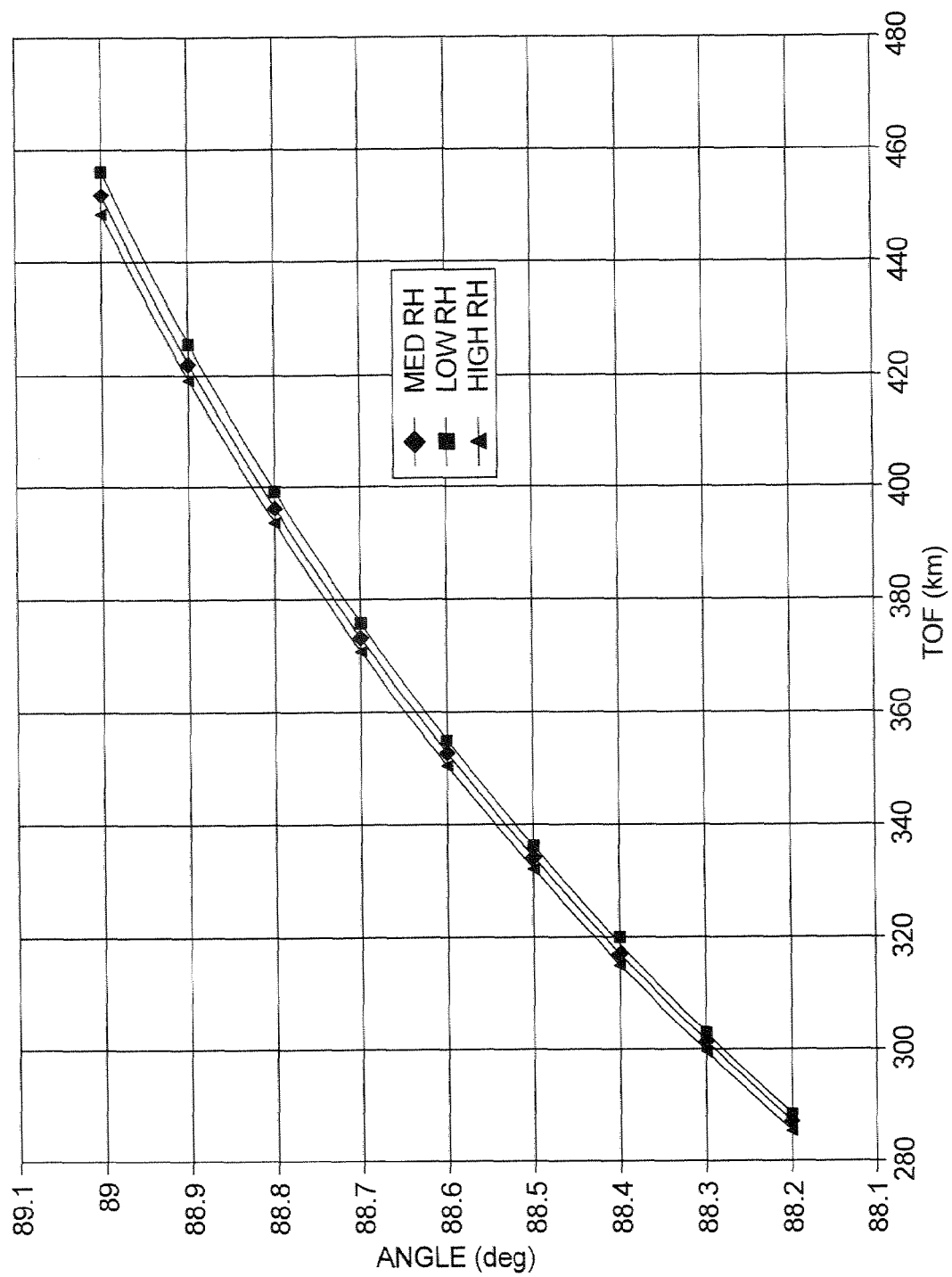
FIG. 13 illustrates the relationship of elevation angle of the radar signal to the time of flight for the three different cases involving low, medium, and high humidity.

Results for a typical case are shown in FIGS. 13 and 14 using the realistic atmosphere of FIG. 5, not the exaggerated humidity of FIGS. 9-11. FIG. 13 shows the relationship of $\theta$ to time of flight for a case with high humidity (the line having triangles thereon) having humidity that is 1.5 times the baseline value. The line with squares on it shows the relationship for a case with low humidity (0.5 times the baseline value). The angle $\theta$ varies by about 0.02 degrees between the high and low humidity cases. Though challenging to measure, this variation is within the capability of some modern airborne radars when multiple samples are statistically combined. Note that the horizontal axis is labeled TOF but is graduated in km. The values are computed in nanoseconds, but converted to the distance light travels in a vacuum during that interval.

FIG. 14 shows Doppler differences at various TOF values, where the zero Doppler value corresponds to the Doppler shift at $\theta=90°$ and higher positions on the vertical axis correspond to shifts to lower frequency. The Doppler shift varies by about 0.1 Hz between the high and low humidity cases. This precision is directly achievable by a few modern radars. However, for most radars, precision like this requires measurements averaged over many samples. This is acceptable, since the system 10 measures refractivity profiles which typically change very little over distances of a hundred kilometers or periods of minutes. So if the aircraft moves twenty kilometers while gathering data over a period of 100 seconds, it does not substantially degrade the accuracy of the estimated profile. For the above exemplary cases, the system 10 does not require high TOF resolution. It suffices for a radar system to have TOF resolution of a few kilometers, so long as the boundaries of the TOF gates are highly repeatable over a series of samples. This is well within the capability of typical airborne weather radars.

Compared to radiosonde measurements using radiosondes launched from ships, the invention provides a lower-cost approach to make temperature and humidity measurements over oceans. On land, economically disadvantaged nations or regions may be unable to afford the up-front cost to create a modern weather infrastructure, but they might be able to afford to purchase weather data or forecasts based on over flights by airlines using the system 10. Compared to dropping small parachute packages from aircraft, the system 10 has lower recurring costs. Compared to GPS occultations with satellites, the system 10 makes effective measurements at lower altitudes, and specifically the altitudes that drive the weather most strongly. In addition, the system 10 provides even better spatial and temporal coverage, which can lead to improved weather forecasts.

Compared to GPS or Iridium occultation measurements from aircraft, the system 10 avoids the cost of installing additional antennas and occultation receivers on a given aircraft. Similarly, when compared to reflected signal occultation from aircraft, the system 10 avoids the cost of installing additional antennas and occultation receivers.

The system 10 is expected to have particular utility in parts of the world with few existing weather instruments, such as China, India, as well as over the Earth's oceans and seas, or in various military theaters of operation where weather related information may be difficult to obtain. The capability to make refractivity measurements without the need to install new hardware onto the aircraft is a significant factor in reducing the cost of implementing the system 10.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for estimating an atmospheric condition existing between a portion of the Earth's surface and an airborne mobile platform traveling over the portion of the Earth's surface, the method comprising:

emitting a radar signal beam toward the Earth's surface from the mobile platform and receiving at least a portion of the radar signal beam reflected from the Earth's surface;

analyzing time of flight information of the radar signal beam as a function of elevation angle, to determine a specific time of flight value associated with a specific elevation angle of said radar signal beam;

using said specific time of flight value to determine a refractivity of said atmosphere through which said radar signal beam and said reflected radar signal has passed; and using said refractivity to determine said atmospheric condition.

2. The method of claim 1, wherein said specific time of flight value corresponds to an elevation angle at an approximate center of said radar beam signal.

3. The method of claim 2, wherein analyzing said time of flight information further comprises determining a normalized reflection intensity of said reflected portion of said radar beam signal versus said time of flight information for said reflected radar signal.

4. The method of claim 3, wherein analyzing said time of flight information further comprises estimating a time of flight value at which said normalized reflection intensity reaches a peak value, and using said time of flight value as said specific time of flight value.

5. The method of claim 2, wherein analyzing said time of flight information comprises measuring a Doppler shift of said reflected portion of said radar signal beam as a function of time of flight.

6. The method of claim 5, wherein measuring time of flight information of the reflected portion of said radar signal beam signal as a function of said elevation angle further comprises computing an elevation angle corresponding to a measured Doppler shift of said reflected portion.

7. A method for estimating an atmospheric condition existing between a portion of the Earth's surface and an airborne mobile platform travelling over the portion of the Earth's surface, comprising:

emitting a radar signal beam toward the Earth's surface from an on-board radar system of the mobile platform;

receiving a reflected radar signal reflected from the Earth's surface;

measuring time of flight information for the reflected radar signal as a function of an elevation angle of the reflected radar signal;

analyzing said time of flight information to determine a time of flight value for said reflected radar signal that corresponds to an elevation angle of an approximate center portion of said radar signal beam;

determining a refractivity of an atmosphere through which said reflected radar signal has passed based on said time of flight value corresponding to said elevation angle of said approximate center portion of said radar signal beam; and estimating said atmospheric condition based on said determined refractivity.

8. The method of claim 7, wherein analyzing said time of flight information to determine a time of flight value for said reflected radar signal that corresponds to an elevation angle of a center portion of said radar beam comprises determining a normalized reflection intensity of said reflected radar signal versus said time of flight information for said reflected radar signal.

9. The method of claim 8, wherein analyzing said time of flight information further comprises estimating a specific time of flight value at which said normalized reflection intensity reaches a peak value.

10. The method of claim 7, wherein analyzing said time of flight information to determine a time of flight value for said reflected radar signal that corresponds to an elevation angle of a center portion of said radar beam comprises measuring a Doppler shift of the reflected radar signal as a function of time of flight.

11. The method of claim 10, wherein measuring time of flight information of the reflected radar signal as a function of said elevation angle further comprises computing an elevation angle corresponding to a measured Doppler shift.

12. The method of claim 7, wherein measuring time of flight information of said reflected radar signal comprises statistically combining a plurality of measurements of time of flight and elevation angle for said reflected radar signal.

13. The method of claim 7, wherein said refractivity is used to determine at least one of a temperature of air and a humidity of air, of said atmosphere that said reflected radar signal has passed through.

14. The method of claim 7, further comprising using a terrain database of topographic information for providing terrain altitude information for use when analyzing said time of flight information, when said mobile platform is flying over a portion of terrain of the Earth.

15. The method of claim 7, further comprising obtaining information from an inertial measurement system carried onboard said mobile platform for assisting in determining a location and an attitude of said mobile platform, and using said location and attitude information in measuring said elevation angle information and in said determining said refractivity.

16. The method of claim 7, further comprising obtaining information regarding at least one of air temperature and air pressure, outside of said mobile platform, substantially at the same time as measuring said time of flight information and using said obtained information to constrain the estimated refractivity comprising a refractivity profile.

17. A method for estimating an atmospheric condition existing between a portion of the Earth's surface and an airborne mobile platform traveling over the portion of the Earth's surface, comprising:

emitting a plurality of radar signal beam pulses toward the Earth's surface from the mobile platform and receiving at least a portion of each said radar signal beam pulse reflected from the Earth's surface;

analyzing time of flight information of the radar signal beam pulses as a function of an elevation angle at which each said radar beam signal pulse was transmitted, to determine a plurality of specific time of flight values associated with specific ones of said elevation angles at which said radar signal beam pulses were transmitted;

determining a refractivity profile of said atmosphere through which said radar signal beam pulses and said reflected portions of said radar signal beam pulses have passed by using said specific time of flight values; and determining a vertical profile of said atmospheric condition based on said refractivity profile, said vertical profile being representative of atmospheric information at a plurality of different altitudes between said Earth's surface and said airborne mobile platform.

18. A system for estimating a refractivity of an atmosphere existing between a portion of the Earth's surface and an airborne mobile platform travelling over the portion of the Earth's surface, comprising:

a radar system for emitting a radar signal beam toward the Earth's surface from the mobile platform and receiving at least a portion of the radar signal beam reflected from the Earth's surface; and a processor in communication with said radar system and adapted to analyze time of flight information of the radar signal beam as a function of elevation angle, to determine a specific time of flight value associated with a specific elevation angle of said radar signal beam, and from said specific time of flight value, to determine a refractivity of said atmosphere through which said radar signal beam and said reflected radar signal has passed.

19. The system of claim 18, further comprising a wireless communications network in communication with said processor for communicating refractivity information determined by said processor to a remote system.

20. The system of claim 18, further comprising a navigational measurement system for determining and providing information concerning a location of the mobile platform, a heading of the mobile platform and an attitude of the mobile platform to said processor.

* * * * *